(No Model.) 2 Sheets—Sheet 1.

J. H. MONTEITH.
FRUIT DRIER.

No. 508,113. Patented Nov. 7, 1893.

WITNESSES:
Fred J. Behse
Herm Friend

INVENTOR
Jabus H. Monteith (No Model.) 2 Sheets—Sheet 2.

J. H. MONTEITH.
FRUIT DRIER.

No. 508,113. Patented Nov. 7, 1893.

WITNESSES:

INVENTOR
Jabus H. Monteith

UNITED STATES PATENT OFFICE.

JABUS H. MONTEITH, OF LOS ANGELES, CALIFORNIA.

FRUIT-DRIER.

SPECIFICATION forming part of Letters Patent No. 508,113, dated November 7, 1893.

Application filed September 21, 1892. Serial No. 446,495. (No model.)

*To all whom it may concern:*

Be it known that I, JABUS H. MONTEITH, a citizen of the United States, residing at Los Angeles, in the county of Los Angeles and State of California, have invented certain new and useful Improvements in Fruit-Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in fruit driers, or fruit evaporators, and to that class of driers operated by steam and hot air, whereby the radiation of the steam heat forces the water out of the fruit and the currents of hot air passing over, among and around the fruit, absorbs the moisture or water and carries it off rapidly into the outer air.

My invention consists in a series of hollow shelves with intermediate spaces, arranged vertically one above the other; hollow end supports with cross cut-offs or steam stops; top steam escapes; a boiler, holding water connected therewith and arranged to contact with heat; a heat deflector secured to one side; air tubes passing through the boiler, and air tubes placed beneath the boiler with openings into or toward the deflector; an outside casing or housing adapted to inclose the hollow shelves, intermediate spaces, and hollow end supports, to shut out all air except that which comes into the deflector through tubes or otherwise. It further consists in moist air discharge tubes secured to the casing, and water inlets and outlets to the boiler.

The objects of my invention are to evaporate the water or moisture out of fruit rapidly by heat and carry it away from the fruit as fast as it is evaporated out, thereby making a pure and perfect article of dried fruit without the use of sulphur or other deleterious article, that will retain its purity intact for years. I attain these objects by means of the peculiar construction and arrangement of the various parts of my device, which will be more fully pointed out and described in the specification and claims, reference being had to the drawings accompanying this application, in which—

Figure 1:
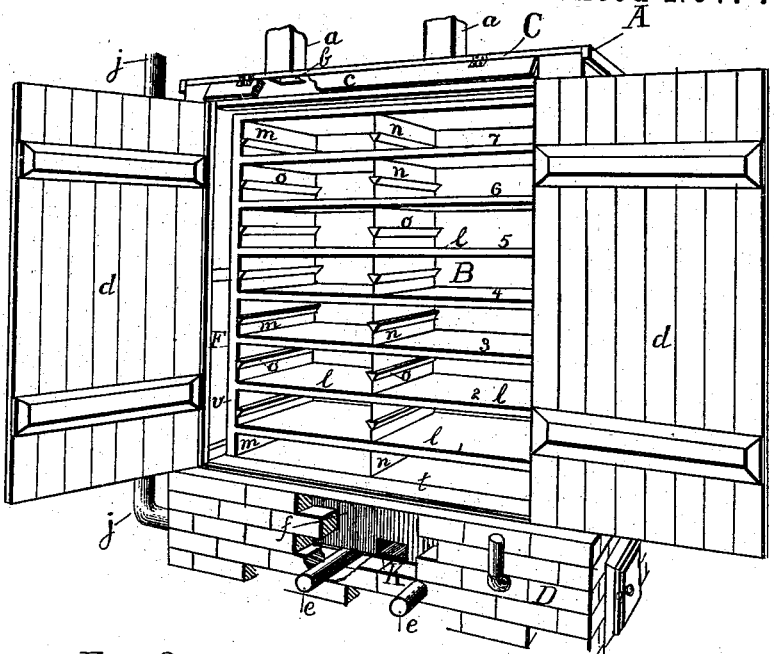
Figure 2:
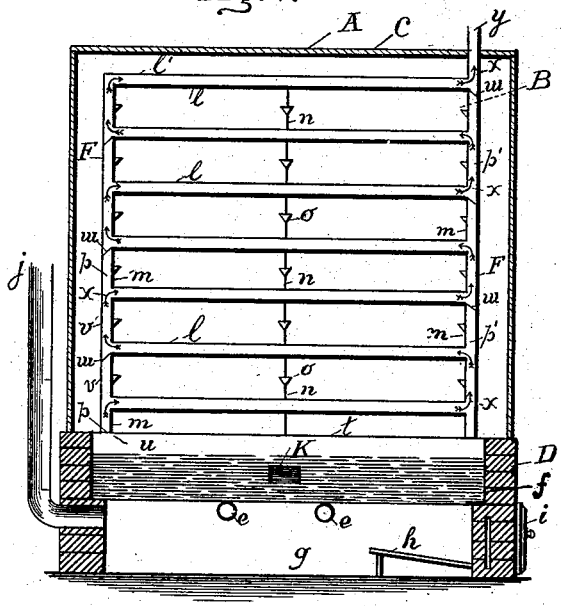
Figure 3:
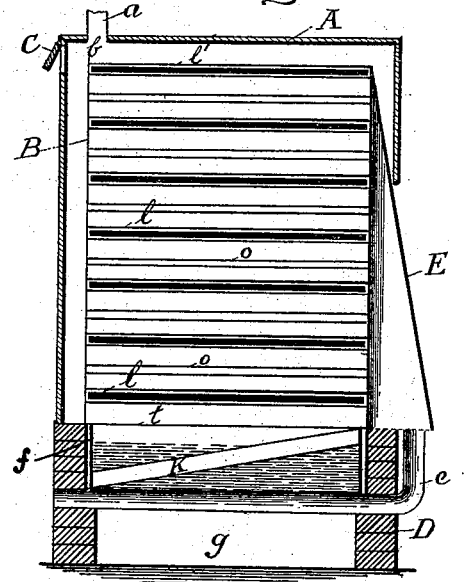
Figure 4:
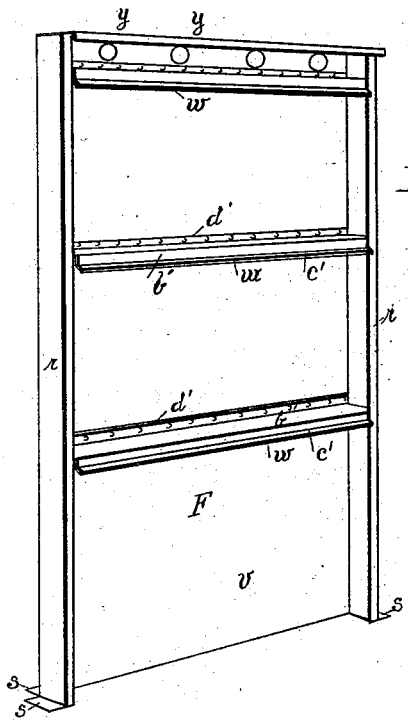
Figure 5:
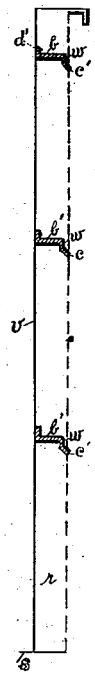
Figure 7:
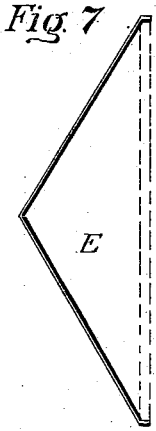
Figure 6:
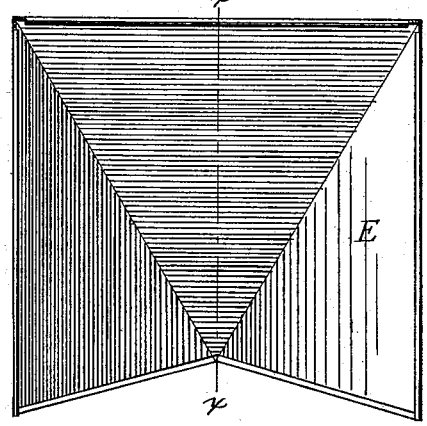
Figure 8:
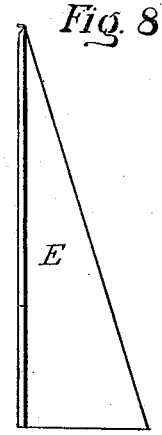

Figure 1, is a perspective view partly in section of my invention. Fig. 2, is a vertical longitudinal sectional view. Fig. 3, is a vertical cross sectional view. Fig. 4, is a detail plan view of one end support section. Fig. 5, is a vertical sectional view of end support. Fig. 6, is a front elevational view of the deflector. Fig. 7, is a cross sectional view of deflector, dotted lines showing edge of body of evaporator. Fig. 8, is a vertical sectional view of deflector taken at line $x\ x$.

Similar letters refer to like parts throughout the drawings.

Referring to the drawings: A, represents the outside casing or housing which may be made of any suitable material (preferably of wood), and B, represents the body proper of the evaporator.

D, represents the brick work or foundation on which the evaporator and casing rests, forming a fire-box and rests for the air tubes and boiler, as shown in Figs. 1, 2, and 3.

The casing A, is formed preferably rectangular in shape and, when the doors are closed, nearly air-tight excepting the air discharge tubes, $a$. The top portion of the casing A, is provided with one or more moist air discharge tubes or draft tubes, $a$, (preferably two) which are formed to register with openings, $b$, formed in the top of said casing. A ventilator, $c$, is hinged to the front edge of the top, C, the purpose of which is when opened to permit the heated and moist air to escape, thereby lowering the temperature inside the casing, and vice versa when closed. The front of casing, A, is provided with one or more doors, $d$, (preferably two,) which are hinged to the side of the casing at either end, and are closed to retain the heat and are opened when desired to place fruit on or off the shelves of the body, B. The common fruit tray may be used to hold the fruit within the body, B, or the fruit may be placed directly on the shelves. The lower portion of the body, B, is rigidly secured to a boiler, $f$, formed of suitable metal (preferably iron), which is adapted to hold water and is formed of suitable size and rests on the pipes, $e$, within the brick foundation walls, D. The hollow pipes, $e$, extend across under the boiler, $f$, and rest on the brick walls of the foundation, their front ends open to the outer air, their rear ends open inside the deflector, a space being left between the inside walls and under the pipes, $e$, to form a firebox, $g$, that is provided with a grate-box, $h$, a door, $i$, and a smoke discharge flue, $j$. A hollow tube (which may be one or more as desired), K, extends from the lower front face of boiler, $f$, back to the rear face, passing through the front and rear side-walls of boiler, $f$, and secured thereto water-tight by any suitable means. Tube, K, may extend through the boiler, $f$, and the water therein at any angle (preferably inclined upward), or it may be coiled within boiler, $f$, before its ends are inserted through said side-walls, the purpose of tube, K, being to receive pure cool air at the front end and deliver it heated and expanded at the opposite end inside the heat deflector, E, which is detachably secured by its edges to the top and sides of the body, B, its lower portion centrally being bent outward to inclose the pipes, $e$, which also take cool air from the front, and, in its passage through the pipes, $e$, it becomes heated by the fire beneath and is delivered inside the deflector, E. This construction is of vital importance in the process of drying and evaporating fruit; as the currents of hot dry air thus formed pass into the body, B, between the shelves, over and around all parts and pieces of fruit therein, they absorb all of the moisture that the steam heat in the shelves has forced out of the fruit and carries said moisture rapidly off upward and outward through the ventilator, $c$, and the air discharge tubes, $a$, into the open air, drying the fruit rapidly without disintegrating or injuring its structure, and preserving intact all of the pure flavor, sirup and juices it originally contained. The body, B, is formed with a series of hollow shelves, $l$, that are held in place vertically, one above another, by the side-walls, $m$, and central walls, $n$, said side-walls, $m$, being secured rigidly to the upper and lower half of each hollow shelf, $l$, preferably by solder, and the central walls are secured in like manner. Each side-wall is formed with a longitudinal projecting bracket, $o$, adapted to hold the edges of fruit trays that are slid in from the front as desired. The ends of the hollow shelves, $l$, open into spaces, $p$, and $p'$, that are formed by the end caps, F, whose bent sides, $r$, extend inward to the vertical edges of the hollow shelves, $l$, and the side-walls, $m$, and are secured thereto by solder or other means. The upper end of end caps, F, extend over onto the top of the upper shelf, $l'$, and soldered thereto, and the lower ends are flanged outward, $s$, and rigidly secured to the top, $t$, of boiler, $f$, near one end, thus forming the hollow spaces, $p$, $p'$; the purposes of the hollow spaces, $p$, $p'$, and hollow shelves, $l$, are for the free transmission of steam that is thrown off from the water in boiler, $f$, when heat is applied beneath. An opening, $u$, is formed in the top, $t$, of the boiler, $f$, near one end between the outer wall, $v$, of end cap F, and the lower vertical side-wall, $m$, to form a free passage for steam from boiler, $f$, into space, $p$.

Cut-offs, or steam stops, $w$, are formed of metal and of any suitable shape, preferably with a flange on each edge turned in opposite directions, and of sufficient length to extend across the end pieces, F, with each end abutting against the inner face of the bent sides, $r$, as shown in Figs. 4 and 5. The purposes of said cut-off, $w$, is to direct the steam that passes up through opening, $u$ (in boiler top, $t$, into space, $p$), into each shelf, back and forth continuously in the course indicated by the arrows, $x$, from one shelf to the other, until the steam passes out of the openings, $y$, formed in the top end of end support, F.

The steam evolved from the water in boiler, $f$, passes up through opening, $u$, into space, $p$, the cut-off, $w$, placed across end support, F, above the lower hollow shelf and below the next hollow shelf above and abutting closely against the outer face of the side-wall, $m$, forces the steam back and turns it into the lower hollow shelf, $l$, through which it passes into space, $p'$, whence it rises in said space until it reaches another cut-off, $w$, that is secured in like manner between the second and third shelves (preferably near the lower edge of the third shelf, to permit the steam to rise in space, $p'$, to impart heat to the ends and side-walls), where it is turned back into the second shelf, $l$, and passes through said shelf into space, $p$, thence upward until it contacts with the next cut-off, $w$, which is placed and secured in like manner, by which the steam is turned into the next shelf below, passing through to space, $p'$, and so on continuously until it escapes at the top, in its passage imparting heat to the shelves and ends simultaneously, maintaining a steady current and flow of steam giving a uniform heat. Sufficient space is formed between the outer face of side-walls, $m$, and the inner face of cut-offs, $w$, to permit the condensed steam to run back into the boiler through opening, $u$, as the end of the boiler having the opening, $u$, is set in place in the brickwork lower than its opposite end. Hence the drip will run back through the shelves and down the space, $p$, into the boiler, $f$. The cut-offs, $w$, are formed with a central longitudinal part, $b'$, having edge flanges, $c'$, $d'$, projecting in opposite directions, the purpose of which is to stiffen and strengthen them, and, when secured to the end supports, F, by solder, rivets or other suitable means, they stiffen said end supports and prevent their outward movement when spaces, $p$, $p'$, are filled with steam.

To the body is secured a heat deflector, E, which is formed V shape in longitudinal cross section at its base; the base being extended outward beyond the casing, A, for the purpose of admitting fresh air and inclosing the discharge ends of hot air tubes, $e$, to receive hot air therefrom, creating a current of air between the shelves, *l*, and out at tubes, *a*.

In the construction of my device, aluminum is the most desirable metal to use on account of its non-corrosive qualities, its strength and lightness; yet any suitable material may be used.

When desirable to handle and dry a large quantity of fruit, two or more of my evaporators may be set together over one fire-box, or connected by a steam pipe from an outside boiler, not shown.

Having described my invention, what I claim, and desire to secure by Letters Patent, is—

1. A fruit drier, consisting of a metal body formed with a series of hollow shelves having open ends and secured one above another by vertical side-walls, formed with longitudinal brackets projecting inward, hollow end supports, provided with cross cut-offs, and adapted to receive the ends of said hollow shelves, a heat deflector, secured to the back of said body, for delivering air upon said shelves, a boiler, having an inclined cross air pipe connecting with the deflector and steam openings secured to and connecting with said hollow supports; in combination with a casing, having a hinged ventilator and outlet air tubes, a fire-box adapted to support said boiler, and cross hot air tubes, at suitable distances apart close to the bottom of said boiler substantially as shown and described.

2. A fruit drier, consisting of a metal body formed with a series of hollow longitudinal shelves, connecting with vertical hollow end supports having longitudinal cut-offs; a boiler, secured to said body and having a water inlet, a central cross air pipe, a steam outlet into said body, and a steam outlet at top of said body, metal air tubes beneath the boiler a heat deflector, secured to the back of said body, and connecting with the tubes in combination with an outside wood casing, resting on brick furnace walls, supporting said metal air tubes and said boiler, substantially as set forth.

3. A fruit drier, consisting of a metal body having a series of vertically arranged hollow shelves, formed with open ends extending into hollow vertical supports, provided with cross cut-offs between the shelf ends, a boiler, secured to the base of said supports and provided with a cross air pipe, a water inlet, and steam opening, an open base deflector, secured to said supports and top shelf, in combination with a casing having doors, a ventilator and steam exhaust tubes, a brick fire-box upholding boiler casing and metal air tubes extending from outer air in front to deflector in rear and longitudinally in contact with under face of the boiler, substantially as set forth.

In testimony whereof I affix my signature in presence of two witnesses.

JABUS H. MONTEITH.

Witnesses:
R. R. BROWN,
GEO. POMEROY.